United States Patent [19]

Nelson

[11] 4,000,554
[45] Jan. 4, 1977

[54] SCREW REMOVING APPARATUS FOR VERTICAL EXTRUDERS

[75] Inventor: Alden W. Nelson, West Mystic, Conn.

[73] Assignee: Crompton & Knowles Corporation, Worcester, Mass.

[22] Filed: Dec. 22, 1975

[21] Appl. No.: 643,070

[52] U.S. Cl. .............................. 29/252; 254/187.4
[51] Int. Cl.² ........................................ B23P 19/06
[58] Field of Search ............ 29/244, 252, 234, 251; 254/187 R; 81/57.16, 57.34

[56] References Cited
UNITED STATES PATENTS

| | | | |
|---|---|---|---|
| 2,645,846 | 7/1953 | Thompson | 29/244 |
| 3,121,941 | 2/1964 | Bellarts | 29/252 |

*Primary Examiner*—Al Lawrence Smith
*Assistant Examiner*—Roscoe V. Parker

[57] ABSTRACT

Screw removing apparatus for vertical extruders wherein the screw is removable through the bottom of the extruder barrel, the apparatus including an adaptor for attaching to the upper end of the screw, a winch for fastening to the adaptor and which includes a yieldable locking means which enables the winch to support the weight of the screw and which yields upon application of a predetermined downward force to the adaptor which is sufficient to overcome the yieldable locking means.

8 Claims, 3 Drawing Figures

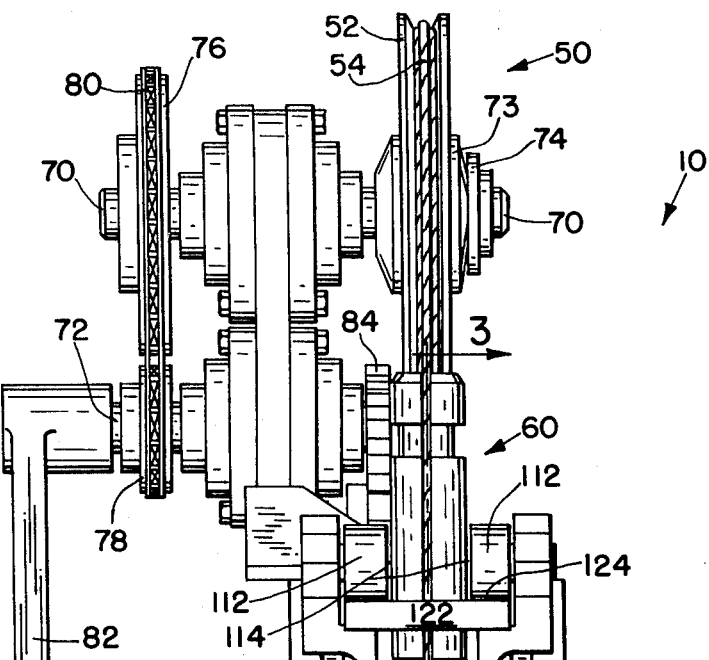
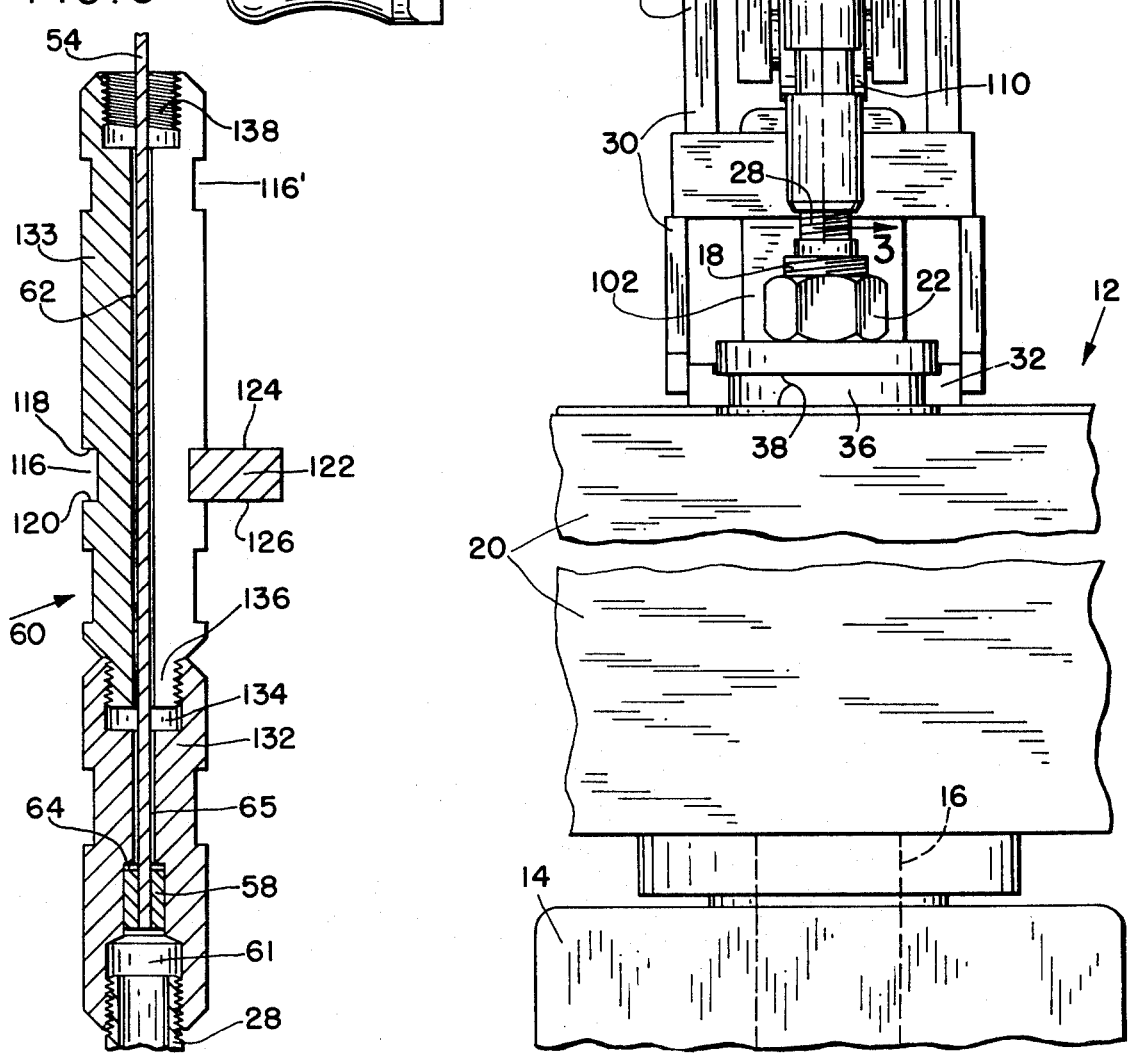

SCREW REMOVING APPARATUS FOR VERTICAL EXTRUDERS

BACKGROUND OF THE INVENTION

The present invention is directed to Apparatus for Removing a screw from the Barrel of a Vertical Extruder. Most extruders are of the horizontal type wherein the elongated barrel of the extruder extends along a horizontal axis. Whenever it becomes necessary to remove the screw for cleaning or changing material to be extruded or for using a different screw, the material which remains in the barrel is extruded as much as possible. There is always some material that remains within the barrel which locks the screw in the barrel. In order to remove the screw, a force is transmitted from the end of the screw to break it free and then the screw is simply drawn out through one end of the barrel.

In vertical extruders wherein the longitudinal axis of the barrel extends vertically, it is not possible to use the same procedure for removing the screw. In vertical extruders, the screw is removed from the bottom of the barrel through a hole in the floor which supports the extruder. Once the screw is loosened, it will fall along the barrel and drop out through the bottom which is likely to cause damage to the screw.

SUMMARY OF THE INVENTION

It is a principal object of the present invention to provide apparatus for removing the screw from a vertical extruder which includes means for loosening the screw within the barrel and yet maintaining control of the screw so that it does not drop to the bottom of the barrel. The apparatus for accomplishing this includes an adaptor for attaching to the upper end of the screw, a winch for fastening to the adaptor and which includes a yieldable locking means which enables the winch to support and weight of the screw and which yields upon application of a predetermined downward force against the adaptor, and power means for transmitting a downward force to the adaptor which is sufficient to overcome the yieldable locking means. The power means frees the screw from the barrel and the winch holds the screw from dropping through the bottom of the barrel. The yieldable locking means of the winch supports the weight of the screw and will only yield to a predetermined force. Once the screw is free, then the winch is utilized to lower the screw from the barrel and out through the bottom of the barrel.

BRIEF DESCRIPTION OF THE DRAWINGS

The invention will be better understood upon the reading of the following description taken together with the drawings in which:

FIG. 2 is a view looking in the direction of arrow 2, FIG. 1; and

FIG. 3 is a vertical section taken along line 3—3 in FIG. 2 and looking in the direction of the arrow.

DETAILED DESCRIPTION OF THE INVENTION

Figure 1:
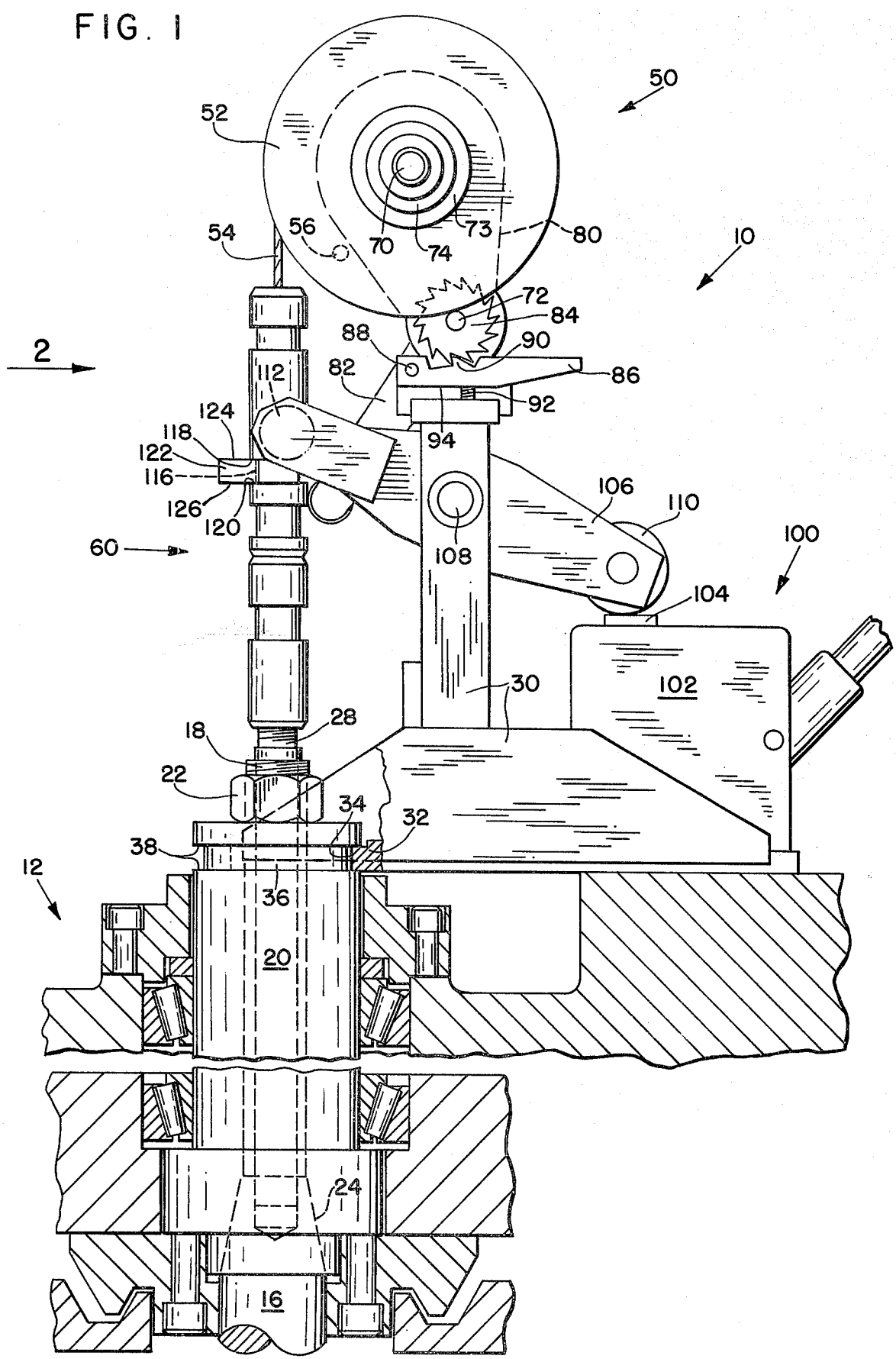
FIG. 1 is a side elevation of the screw removing apparatus in the present invention as applied to a vertical extruder.

Referring particularly to the FIGS. 1 and 2, the screw removing apparatus in the present invention is generally indicated by reference numeral 10 and is shown in screw removing position on a vertical extruder indicated generally at 12. Extruder 12 includes a barrel 14 and a screw 16 located within the barrel 14. The particular vertical extruder shown includes a drawing-in sleeve 18 which is screwed into the upper end of the screw 16 and is effective to draw the screw into a gearbox thrust shaft 20. The upper end of the drawing-in sleeve 18 is threaded and a nut 22 is utilized to fasten drawing-in sleeve 18 against the gearbox thrust shaft 20. The upper end of the screw 16 is tapered and fits into a tapered hole 24 in gearbox thrust shaft 20. Tightening of nut 22 draws the tapered portion of the screw into hole 24 and helps to locate the screw centrally within the barrel 14. The gearbox thrust shaft is rotated by driving means, not shown, which in turn is effective to rotate the screw 16 within the barrel. After nut 22 is tightened to lock the screw 16 into the gearbox thrust shaft, drawing-in sleeve 18 will rotate with the screw and can be considered as a part of the screw. It is to be understood that other types of screw locating means and screw supporting means can be used and that the present arrangements disclosed are only examples. The upper end of drawing-in sleeve 18 has a threaded portion 28 for a purpose to be described hereinbelow.

Screw removing apparatus 10 includes a frame 30 which includes a foot 32 which contains a slot 34 located at one end thereof. The upper end of gearbox thrust shaft 20 has a reduced portion 36 which forms a pair of annular shoulders 38. Reduced portion 36 fits into slot 34 and the shoulders 38 function to restrain frame 30 against vertical movement.

A winch generally indicated by the reference numeral 50 is also mounted on frame 30 and includes a pulley 52 and a cable 54, one end of which is trained around pulley 52 and anchored to it at 56. The other end of cable 54 extends downwardly from the pulley 52 and has fixed at its extremity an enlarged portion or anchor 58.

An adaptor, generally indicated at 60, comprises two parts, a lower part 132 and an upper part 133. Lower part 132 includes a lower threaded opening 61 which is threaded onto portion 28 of the drawing in sleeve and includes upper threaded opening 134. Lower part 132 also contains a cavity 64 within which anchor 58 is inserted. The cable 54 extends from cavity 64 through a narrow opening 65. Upper part 133 includes a lower threaded extension 136 which fits into opening 134 and on upper threaded opening 138 for receiving the lower threaded extension 136 of an additional identical upper portion 133. Upper portion 133 contains an elongated vertical slot 62 which allows the upper portion 133 to be fastened to lower portion 132 while the cable 54 extends from lower portion 132. Winch 50 includes an upper shaft 70 and a lower shaft 72. Pulley 52 is loosely mounted on shaft 70 and an inner friction disc 73 is fixed to pulley 52. An outer friction disc 74 is fixed to shaft 70 in frictional driving contact with inner friction disc 73. An upper sprocket 76 is fixed to shaft 70 and a lower sprocket 78 is fixed to shaft 72. A chain 80 drivingly connects sprocket 78 to sprocket 76. A crank 82 is also fixed to shaft 72 and is effective upon turning to rotate shaft 72 and thereby rotate shaft 70 through sprocket chain 80. Rotation of shaft 70 causes outer friction disc 74 to rotate which in turn causes inner friction disc 73 to rotate because of their driving engagement. Since inner friction disc 73 is fixed to pulley 52, rotation of crank 82 will cause pulley 52 to rotate. Cable 54 will be wound or unwound from pulley 52 depending on which direction crank 82 is rotated. A ratchet gear 84 is fixed to shaft 72. A lever 86 is pivotally mounted on frame 30 at 88 and contains on its upper surface a ratchet tooth 90. A spring 92, located below arm 86 engages the lower surface 94 of the arm and urges ratchet tooth 90 into engagement with the teeth of ratchet gear 84. Turning of shaft 72 in a clockwise direction as viewed in FIG. 1 causes the teeth of the ratchet gear to urge lever 86 downward against spring 92 and allows the teeth of the ratchet gear to slip by ratchet tooth 90. Movement of shaft 72 in a clockwise direction, as viewed in FIG. 1, also causes shaft 70 to rotate in a clockwise direction and enables the cable 54 to be wound on pulley 52. Rotation of shaft 72 in a counterclockwise direction, as viewed in FIG. 1, will be prevented as the teeth of the ratchet gear and tooth 90 engage to prevent further rotation of shaft 72. This prevents unwinding of cable 54. By depressing the end of lever 86 against spring 92, ratchet tooth 90 will be clear of the teeth of ratchet gear 84. This allows crank arm 82 to rotate in a counterclockwise direction as viewed in FIG. 1 which, in turn, causes shafts 72 and 70 to rotate and thereby to lower cable 54 and as it is unwound from pulley 52.

A power source generally indicated by reference numeral 100 is also mounted on frame 30 and comprises a hydraulic housing 102 which includes a piston 104 which is raised vertically upon actuation of the power source. A bell crank lever 106 is pivoted at 108 to the framework 30 and has a follower 110 mounted on one end of the lever 106 for engagement with piston 104. The opposite end of lever 106 is bifurcated and has mounted thereon followers 112 pivotally mounted to the inside surfaces of the bifurcated portions. A space 114 is formed between the followers 112. Adaptor 60 has a reduced portion 116 which forms upper and lower shoulders 118 and 120, respectively. A slotted key 122 has upper and lower surfaces 124 and 126, respectively, which bear against shoulders 118 and 120, respectively. The space 114 between followers 112 is wider than the adaptor and allows the followers to straddle the adaptor and bear against the upper surface 124 of key 122.

Actuation of power means 100 will cause piston 104 to move upwardly and partially rotate arm 106 around pivot 108. This will force followers 112 downwardly against the upper surface 124 of key 122 with a force which is sufficient to overcome the frictional driving force between discs 73 and 74 when lever 86 is in the locked position. This will drive the adaptor 60 downwardly together with this screw 16. If desired, key 122 may be an integral part of adaptor 60.

To remove a screw 16 from the barrel 14, screw removing apparatus 10 is brought into the position shown in FIG. 1 so that foot 32 is inserted onto reduced portion 36 to anchor and support the apparatus 10 with respect to the extruder. Lower portion 132 of adaptor 60 is threaded onto portion 28 and upper portion 133 is laterally slid onto cable 54 and screwed into lower portion 132. Lever 86 is maintained in locked position so that screw 16 is firmly held against downward motion. The amount of friction between outer disc 74 and inner disc 73 is greater than that which will support the weight of the screw 16. This friction will be overcome only upon application of a sufficient downward force against the adaptor to allow for downward movement of the screw. Once that the screw is securely held as described above, nut 22 is loosened.

The inner diameter of nut 22 is greater than the outer diameter of the adaptor so that the adaptor may be lowered through the nut 22. Key 122 is inserted onto reduced portion 116 and the followers 112 are placed in contact with the upper surface 124 of the key 122. Power means 100 is actuated so that piston 104 rocks bell crank lever 106 counterclockwise as viewed in FIG. 1 and transmits this force to the adaptor key 122 with sufficient force to overcome the frictional force between discs 74 and 72 and to free the screw from the barrel.

Reduced portion 116 is located on upper part 133. In the event that one stroke of the bell crank lever will be insufficient to free the screw from the barrel, upper part 133 contains an additional reduced potion 116' for reception of key 122. Followers 112 can again be applied to the upper surface 124 after key 122 has been inserted onto reduced portion 116' after bell crank lever 106 has been brought back to its original position as shown in FIG. 1. Power source 100 is again actuated to rock bell crank lever 106 to provide a second downward motion to the adaptor 60 and thereby move screw 116 an additional amount within the barrel 14. In the event that the screw 16 is still not freed within barrel 14, an additional upper part 133 is screwed into opening 138 and the key 122 is applied to the reduced portions 116 and 116' of this additional upper part 133 to provide additional downward motion to adaptor 60.

I claim:
1. Screw removing apparatus for removing a screw from the barrel of a vertical extruder in which the screw is removable through the bottom of said barrel, said apparatus comprising:
    a. an adaptor for fastening to the upper end of said screw and which contains at least one surface which is horizontal when said adaptor is fastened to said screw from which a downward force may be transmitted through said adaptor to said screw;
    b. a winch adapted for fastening to said adaptor and which includes yieldable locking means for enabling said winch to support the weight of said screw and which is yieldable for allowing downward movement of said screw upon application of a predetermined downward force against said horizontal surface; and
    c. power means adapted for engaging said horizontal surface for transmission of a downward force which is sufficient to overcome said yeildable locking means and cause downward movement of said screw.

2. The screw removing apparatus as set forth in claim 1 wherein said winch includes a cable and an enlarged anchoring element attached to the end of said cable and wherein said adaptor comprises a cavity for accepting said anchoring element and an opening which extends from said cavity through which said cable extends.

3. The screw removing apparatus as set forth in claim 2 wherein said adaptor comprises a lower portion which contains said cavity and an upper portion removably mounted on said lower portion, said upper portion containing an elongated vertical slot within which said cable may be laterally inserted prior to mounting of said lower portion to said upper portion, said upper portion containing said horizontal surface and being constructed for coupling with another identical upper portion for increasing the effective length of said adaptor.

4. The screw removing apparatus as set forth in claim 1 wherein the horizontal surface of said adaptor includes portions which extend from opposite sides of said adaptor and said power means includes a force transmitting arm having a bifurcated end for straddling said adaptor and simultaneously engaging the portions of said horizontal surface which extend from opposite sides of said adaptor.

5. Screw removing apparatus for removing a screw from the barrel of a vertical extruder in which the screw is removable through the bottom of said barrel, said apparatus comprising:
 a. an adaptor for fastening to the upper end of said screw and which contains at least one surface which is horizontal when said adaptor is fastened to said screw from which a downward force may be transmitted through said adaptor to said screw;
 b. a winch adapted to be fastened to said adaptor for raising and lowering said screw;
 c. means for locking said winch against downward movement of said screw;
 d. yieldable means connected to said winch for supporting the weight of said screw and which is yieldable for allowing downward movement of said screw upon application of a predetermined downward force against said horizontal surface; and
 e. power means adapted for engaging the horizontal surface of said adaptor for transmission of a downward force which is sufficient to overcome said yieldable means and cause downward movement of said screw.

6. The screw removing apparatus as set forth in claim 5 wherein said yieldable means comprises a slip clutch which forms an integral part of said winch.

7. The screw removing apparatus as set forth in claim 6 wherein said locking means comprises a pawl and ratchet mechanism which has a locked position for allowing said winch to raise said screw and for preventing said winch from lowering said screw and an unlocked position for allowing said winch to raise and lower said screw.

8. Screw removing apparatus for removing a screw from the barrel of a vertical extruder in which the screw is removable through the bottom of said barrel, said apparatus comprising:
 a. a supporting frame adapted to be fixed relative to said extruder;
 b. an adaptor for fastening to the upper end of said screw and which contains at least one surface which is horizontal when said adaptor is fastened to said screw from which a downward force may be transmitted through said adaptor to said screw;
 c. a winch mounted on said frame and adapted for fastening to said adaptor and which includes yieldable locking means for enabling said winch to support the weight of said screw and which is yieldable for allowing downward movement of said screw upon application of a predetermined downward force against said horizontal surface; and
 d. power means mounted on said frame and adapted for engaging said horizontal surface for transmission of a downward force which is sufficient to overcome said yieldable locking means and cause downward movement of said screw.

* * * * *